July 19, 1949.  H. L. TITUS  2,476,517
ELECTRIC LIGHTING SYSTEM
Filed Sept. 19, 1947
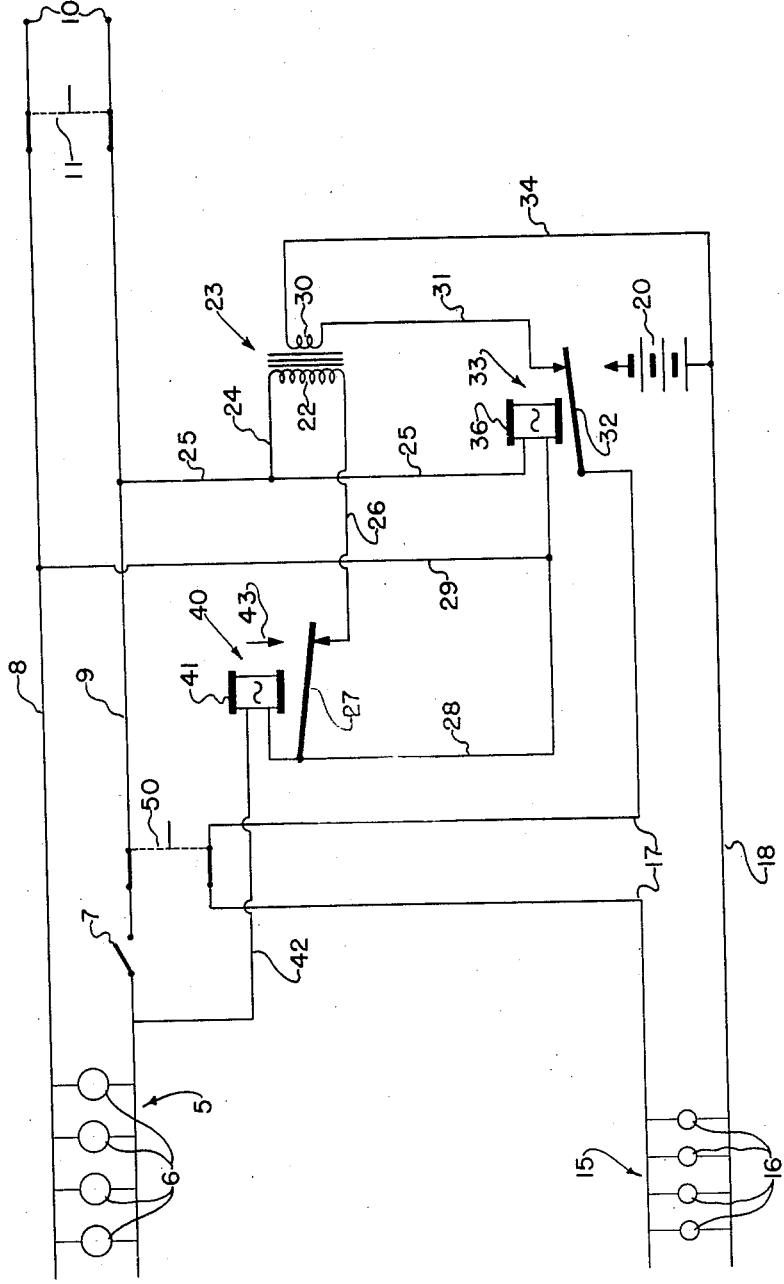
Inventor.
H. L. TITUS
By Harvey O'Connell
Attorneys.

Patented July 19, 1949

2,476,517

UNITED STATES PATENT OFFICE 2,476,517

ELECTRIC LIGHTING SYSTEM

Horace L. Titus, Sterling, Colo.

Application September 19, 1947, Serial No. 775,102

2 Claims. (Cl. 315—90)

This invention relates to electric lighting systems and particularly to lighting systems providing two degrees of illumination and providing for emergency operation during periods of interruption of the main source of power.

In frozen food locker rooms and other cold storage rooms, as well as in theaters, public meeting halls, and hospital operating rooms, it is desirable to provide two degrees of illumination, and it is essential to provide illumination from an auxiliary source during periods of failure of the main power source. It is a general object of this invention to provide such a lighting system which is automatic in operation.

In pursuance of this general object, I provide a primary lighting circuit and a secondary lighting circuit, both normally supplied from a main power source such as a public service power line. The primary lighting circuit provides bright illumination, and when the primary circuit is turned off the secondary lighting circuit is automatically energized to provide limited illumination in the same general area. The secondary lighting circuit is preferably designed for operation at a low voltage and is supplied from the main power source through a step-down transformer. In the event of a failure of the main source of power, the secondary lighting circuit is automatically connected to a battery or other auxiliary power source. When the emergency is over, the battery is automatically disconnected and energy is supplied to either the primary or the secondary lighting circuit depending on the position of the primary lighting circuit switch.

Other objects will be apparent to those skilled in the art from the following description taken in conjunction with the appended drawing, wherein I show a schematic circuit diagram of the presently preferred form of the invention.

Referring in detail to the drawing, primary lighting circuit 5 includes a plurality of electric light bulbs 6 and a circuit switch 7. The primary lighting circuit is supplied by means of wires 8 and 9 from the main power source 10, which may be the public service power line. A double-pole switch 11 is provided to disconnect wires 8 and 9 from the main power source. The primary lighting circuit is designed from the main power source. The primary lighting circuit is designed for operation at the voltage of the main power source, which ordinarily is 115 volts.

A secondary or auxiliary lighting circuit 15 includes a plurality of electric light bulbs 16 disposed to illuminate the same general area as the primary circuit light bulbs 5. The secondary lighting circuit is supplied with electricity through wires 17 and 18 from main power source 10 or battery 20 in a manner to be described. For purposes of conservation of electrical energy, secondary lighting circuit 15 is preferably designed for operation on a low voltage such as 6 volts.

The switches and relays are shown in positions corresponding with the conditions wherein the primary lighting circuit is turned off and the secondary lighting circuit is energized from the main power source through a step-down transformer. Step-down transformer 23 has its primary coil 22 connected on one side through wires 24 and 25 to main line wire 9, and on the other side through wire 26, contact arm 27 of A. C. relay 40, wire 28 and wire 29 to main line wire 8. The secondary coil 30 of step-down transformer 23 is connected to the secondary lighting circuit 15 on one side through wire 31, contact arm 32 of A. C. relay 33 and wire 17, and on the other side through wires 34 and 18.

Coil 36 of A. C. relay 33 is energized from line wires 8 and 9 through wires 29 and 25. Therefore, contact arm 32 is held in contact with wire 31 at all times when line switch 11 is closed and there is no failure of the main power source 10. In the event of failure of the main power source 10, relay 33 is deenergized and contact arm 32 moves into contact with the top side of battery 20. The battery then supplies current to the secondary lighting circuit until the emergency is over.

The coil 41 of the second A. C. relay 40 is connected on one side to main line wire 8 through wires 28 and 29 and on the other side to main line wire 9 through wire 42 and switch 7 when in closed position. When switch 7 is closed to energize the primary lighting circuit 5, coil 41 is energized causing contact arm 27 to move upward against stop 43, thereby interrupting the flow of current in the primary coil of transformer 23 and thus shutting off the secondary lighting circuit 15. The operation of relay 40 is such that either the primary or the secondary lighting circuit provides illumination so long as the main power source 10 does not fail.

A double-pole system deenergizing switch 50 is provided to simultaneously open main line wire 9 and secondary circuit wire 17 when no illumination is desired, as, for example, at night or during shut-down conditions.

The general operation of the system is as follows: Primary lighting circuit 5 supplies bright illumination for normal working conditions when switch 7 is closed. When the illuminated area is not in use, but a limited amount of illumination is desired, switch 7 is opened and secondary lighting circuit 15 is supplied from transformer 23 connected to the main line source 10. In the event of failure of the main source 10, relay 33 is deenergized and the secondary lighting circuit 15 is connected to battery 20. When the emergency is over, relay 33 is re-energized and illumination is supplied by either the secondary or primary lighting circuit depending on the position of switch 7. It is apparent that the system is practically foolproof in operation and adapted to automatically provide the desired illumination under all conditions.

While the invention has been described in detail in its present preferred embodiment, it will, of course, be understood that such has been done for purposes of illustration only and not by way of limitation, and therefore only such limitations are to be imposed thereon as may reasonably come within the scope of the appended claims.

What I claim is:

1. In combination with a main power source, a primary lighting circuit, a secondary lighting circuit, an emergency source for said secondary lighting circuit, a switch in the primary circuit to selectively control the operation of the primary and secondary circuits by said main power source, and a relay energized by said main power source and adapted to connect said battery emergency source to the secondary circuit in case of failure of the main power source.

2. In combination with a main power source, a primary lighting circuit, a transformer and a secondary lighting circuit normally connected to the source, a switch in the primary circuit to control the operation of both circuits, a relay operative responsively to said switch to disconnect the transformer from the source, an emergency power source, a second relay operative responsively to failure of the source to connect the emergency power source to the secondary lighting circuit, and a common switch to break all circuits simultaneously.

HORACE L. TITUS.

REFERENCES CITED

The following references are of record in the file of this patent:

UNITED STATES PATENTS

| Number | Name | Date |
|---|---|---|
| Re. 16,917 | Williams | Mar. 27, 1928 |
| Re. 19,848 | Beetem | Feb. 11, 1936 |
| 1,753,101 | Whittingham | Apr. 1, 1930 |
| 1,922,079 | Dixon | Aug. 15, 1933 |
| 1,946,570 | Beidler | Feb. 13, 1934 |
| 2,067,653 | Witmer | Jan. 12, 1937 |

FOREIGN PATENTS

| Number | Country | Date |
|---|---|---|
| 538,673 | Great Britain | Aug. 12, 1941 |